United States Patent [19]
Ishizaka

[11] Patent Number: 5,223,683
[45] Date of Patent: Jun. 29, 1993

[54] HIGH FREQUENCY ELECTRONIC WELDING SYSTEM

[75] Inventor: Yuji Ishizaka, Tokyo, Japan

[73] Assignee: Kabushiki Kaisha Meidensha, Tokyo, Japan

[21] Appl. No.: 917,202

[22] Filed: Jul. 22, 1992

[30] Foreign Application Priority Data

| | | | |
|---|---|---|---|
| Jul. 23, 1991 | [JP] | Japan | 3-182172 |
| Oct. 2, 1991 | [JP] | Japan | 3-254002 |
| May 25, 1992 | [JP] | Japan | 4-131264 |

[51] Int. Cl.$^5$ ............................................. H05B 6/06
[52] U.S. Cl. ........................................ 219/8.5; 219/9.5; 219/10.77; 219/110
[58] Field of Search .................. 219/8.5, 9.5, 10.77, 219/109, 110, 111, 124.34; 364/477

[56] References Cited

U.S. PATENT DOCUMENTS

| | | | |
|---|---|---|---|
| 3,573,416 | 4/1971 | Drechsler | 219/8.5 |
| 4,357,512 | 11/1982 | Nishimoto et al. | 219/8.5 |
| 4,492,847 | 1/1985 | Masaki et al. | 219/124.34 |
| 4,798,925 | 1/1989 | Ishizaka | 219/8.5 |
| 4,833,381 | 5/1989 | Taft et al. | 219/124.34 |
| 4,835,362 | 5/1989 | Nakashima et al. | 219/130.1 |
| 4,877,940 | 10/1989 | Bangs et al. | 219/124.34 |

FOREIGN PATENT DOCUMENTS

| | | |
|---|---|---|
| 3-155478 | 7/1991 | Japan . |
| 0353409 | 2/1990 | EPO . |
| 2575686 | 7/1986 | France . |
| 3228994 | 3/1983 | Germany . |
| 57-206581 | 12/1982 | Japan . |
| 58-025883 | 2/1983 | Japan . |
| 61-088981 | 5/1986 | Japan . |
| 3-155478 | 7/1991 | Japan . |

Primary Examiner—Philip H. Leung
Attorney, Agent, or Firm—Foley & Lardner

[57] ABSTRACT

A high frequency welding system for tubular members applies high frequency current I to the gap for creating an alternating field. According to magnetic flux of the alternating field, an opposed current i is generated in a conductive portion of the welding apparatus. In close proximity, inductance is effected between the welding current I and the response current i. An output circuit is provided for generating high frequency current for establishing a welding heat with suppression of ripple current at the output. The welding processing is observed by a CCD camera which is in communication with an image processing portion for analyzing image data for determining welding conditions. A signal from the image processing portion is output to a monitoring portion which continuously monitors welding operation and activates an alarm if welding conditions exceed predetermined values. A correction processing portion also receives the signal from the image processing portion and effects adjustment of the power circuit for maintaining a welding heat at a desired level.

17 Claims, 15 Drawing Sheets

HIGH FREQUENCY ELECTRONIC WELDING SYSTEM

BACKGROUND OF THE INVENTION

1. Field of The Invention

The present invention relates generally to a high frequency welding system. Particularly the present invention relates to a high frequency seam welding system which can control a manufacturing process for providing sealing by welding between opposite sides of a material being formed into a cylindrical shape such as piping, for example.

2. Description of The Prior Art

Production systems for piping and other tubular members are known in which a workpiece is fed from a roll of metal strip in a tubular formation such that opposite sides thereof are positioned adjacently. An upset pressure is supplied to butt the sides of the workpiece together at a jointing point and supplying a high frequency electrical power to the workpiece to weld the opposite side surfaces at a welding point. It is conventional practice to adjust the intensity of the welding heat generated at, and near the jointing point by controlling the high frequency power to the workpiece based upon various conditions which are monitored by sensors during the production process. However, it is very difficult to monitor each of the many conditions which may affect welding heat during such a production process.

FIG. 7 shows an electromagnetic inductance type conductive portion for a welding system, FIG. 8 shows contact type conductive portion of conventional seam welding systems for forming cylindrical members. According to the drawings, a material 1 for forming a pipe undergoes a multistage process for rolling the material 1. When the material 1 is first rolled to approach a cylindrical shape, a V-shaped gap, or seam, 2 is formed along one side of the rolled material 1 as the material 1 is rolled in the direction of the arrow A of FIGS. 7 and 8. The V-shaped gap is known as a V throat. According to the electromagnetic inductance method of FIG. 7, a heating coil 3a is powered from a high frequency power source through a power circuit. The welding heat under which the workpiece, or material 1 is welded, at a welding point 1a, is determined by the level of power applied to the heating coil 3a. According to the contact type system of FIG. 8, a high frequency current I is applied from an electrical source, or work coil 3 which is connected to opposed sides 2a and 2b of the V-shaped gap 2 via electrodes 4a and 4b respectively.

After either of the above described steps, the pipe material 1 is put between squeeze rollers 5a and 5b which apply an upset pressure in the directions of arrows B and C of FIGS. 7 or 8 for joining the opposed sides 2a and 2b for continuously forming a welded line seam 10.

FIG. 14 shows a cross section of end pieces 2a and 2b of a seam to be joined by welding. Heated portions of the seam are shown in the drawing by hatching. Referring to FIG. 14(A), the flat ends of each side 2a, 2b of the seam 10 to be joined are heated. According to this arrangement wherein a welding current I is applied to sides of the seam 10, a proximity effect is conspicuous between the opposed ends 10a, 10b of the seam 10. FIG. 14(B) is a close-up view of a thickness portion of the end pieces 10a and 10b of the seam 10, as can be seen from the drawing, according to this effect, a current I is stronger at a corner portion of the ends 10a and 10b, thus heating is stronger at each corner of each of the ends to be joined. Thus, as seen in FIG. 14(C), when pressure is applied by the squeeze rollers 5a and 5b for joining the ends 10a and 10b of the seam 10, a center portion thereof is heated less than the corner portions which can lead to spattering of heated metal when the ends 10a, 10b are joined under pressure and may further lead to formation of 'pinholes' along the seam thus degrading the quality of welded seam.

In order to deal with the problem outlined above, Japanese Patent Application 2-139244 discloses an alternative type of conventional seam welding system as shown in FIG. 9. According to this arrangement, before the seam 10 proceeds to the seam welding portion 6 of the apparatus, it is preheated at a preheating portion 7. The preheating portion includes a guide means 8 and a second electrical source 9 for supplying mid and low frequency current to the seam 10. The guide means is interposed between an inner and outer surface of the material 1 for supplying relatively low frequency heating to a core, or center portion of the ends 10a and 10b of the seam 10 allowing substantially even heating of the core and corner portions of ends 10a, 10b to be achieved at the welding stage for forming the seam 10.

According to the above arrangement, a relatively high cost is incurred due to the more complex apparatus and, according to the application of high and lower frequency currents for heating, a high output electrical source is required. Such high output sources are subject to current variation at high frequencies.

FIG. 19 shows a induction heating circuit for such conventional welding systems. The circuit includes a hot cathode electron tube 40, and an oscillator circuit 50 therefor, a direct current voltage Edc is required for causing oscillation of the electron tube 40. A three phase voltage $e_1$ is introduced through a stepdown transformer TR1 to be limited to a withstand threshold of a thyristor 100, the thyristor 100 regulates the output which is supplied to an amplifying transformer TR2 and is then supplied to a three phase rectifier circuit 20 and a filter 30 is provided for smoothing.

Further shown in FIG. 19 is a filament circuit 70 for the electron tube 40. A single phase source voltage $e_2$ is supplied to the filament circuit 70 through an AVR (Automatic Voltage Regulator). The stabilized output from the AVR is supplied to a filament transformer TR3 and the output of the transformer TR3 is supplied to the filament 40a of the electron tube 40 for heating thereof. Also associated with the electron tube 40 is a grid bias circuit 80, capacitors $Ct_1$, $Ct_2$ and feedback capacitors $Cg_1$ and $Cg_2$.

The above described type of circuit is subject to ripple current which requires provision of a filter. However, for effectively smoothing such ripple current, a large capacity choke coil and a condenser must be added, increasing the size, weight and complexity of such a circuit.

Further, for low frequency ripple a filter for higher harmonic frequencies is needed, and the size and cost of the circuit is increased. In addition, the thyristor 100 provided for voltage regulation has too slow a response to effectively deal with such ripple current.

When such as circuit as the above-described is used as a heating circuit for induction welding, for example, ripple current present in the circuit creates fluctuation in the high frequency output voltage in the emissions of the electron tube 40 causing unevenness in the resulting welds.

For monitoring such a welding system, one of the following three methods are conventionally employed; 1) visual monitoring by a system operator, 2) measuring irradiated temperature of the welding operation, 3) electronically detecting oscillation frequency variation for discriminating excess applied heating 4) monitoring the shape and projection of a welding bead;

SUMMARY OF THE INVENTION

It is therefore a principal object of the present invention to overcome the drawbacks of the prior art.

It is a specific object of the invention to provide a welding system in which sufficient heating is supplied with suppressing ripple current and in which welding operation is continuously monitored for warning a system operator when welding conditions fail outside of optimum values.

There is provided a welding system, comprising:

a work piece fed to a welding point at which a V throat present in said work piece is fuzed into a welded seam;

a CCD euipped camera for continuously scanning a welding operation and outputting a first signal indicative thereof;

masking means, interposed between said camera and said welding point for providing a visual reference for dividing a camera image into zones;

conversion means for receiving an output from said camera and converting said output to a digital for an outputting a second signal indicative thereof;

first memory means for storing digital welding image data based on said digital signal;

second momory means for storing reference image data;

processing means for accessing said first and second memory means and comparing said reference image data with said welding image data and producing a third signal indicative of said comparison;

monitoring means, receiving said third signal and monitoring a welding condition based thereon, said monitoring means outputting sequentially updated image data based on said third signal for showing a current welding condition and outputting an alarm signal indicative of undesirable welding conditions including upper and lower heat values when said welding condition is excessive of said predetermined conditions;

display means receiving said sequenstially updated image data;

alarm means receiving said alarm signal;

correction adjustment means, recieving said third signal and calculating a degree of adjustment of an output power of said welding system based on said third signal and outputting a fourth signal indicative of said degree of adjustment;

second conversion means, receiving said fourth signal and converting said signal for outputting a fifth, analog signal corresponding to said degree of adjustment;

signal regulating means, receiving said fifth signal and further receiving a sixth signal indicative of a reference power level, said signal regulating means comparing said fifth and sizth signals and outputting a seventh signal indicative of a power variation value;

power output means, recieving said seventh signal and adjusting a power level of a heating portion of said welding system;

a conductive member, positioned in a Vthroat of a tubular member being welded for establishing an inductive current at said V throat, sufficiently heating a welding point of said tubular member for effecting continuous welding of a seam along said tubular member in accordance with control effected by saidimage processing portion, said monitoring portion and said power control portion.

DESCRIPTION OF THE PREFERRED EMBODIMENT

Although the welding system of the invention will be described in connection with a high-frequency welding unit for production of tubular members, it will be understood that the invention is also applicable to other types of production processes.

Generally, a welding system comprises three components, these being a production monitoring portion, a conductive, or heating, portion and an output portion for supplying high frequency voltage to the conductive portion.

Figure 1:
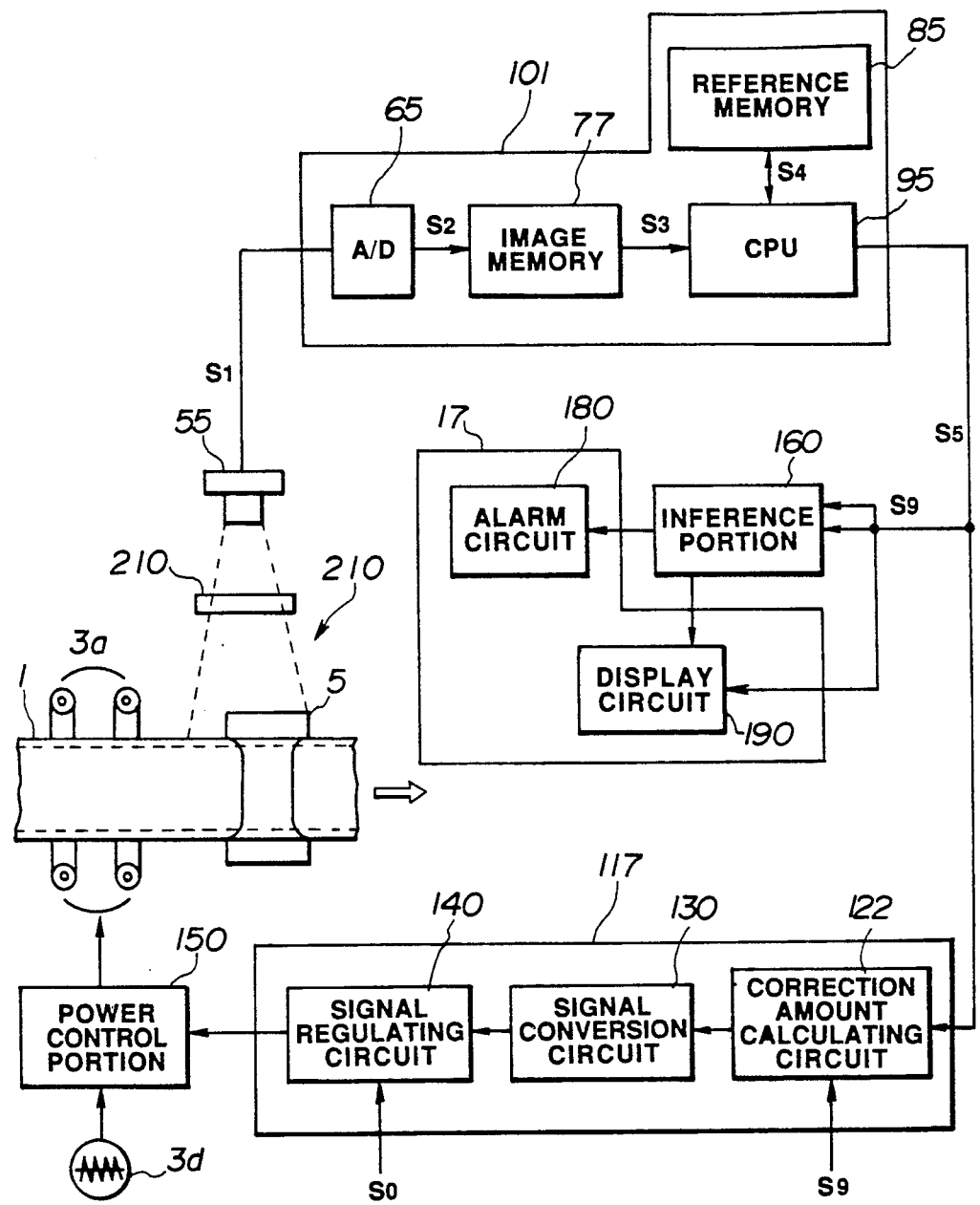
FIG. 1 is a schematic view of image monitoring and welding arrangements of a high frequency welding system of the invention.
Figure 2:
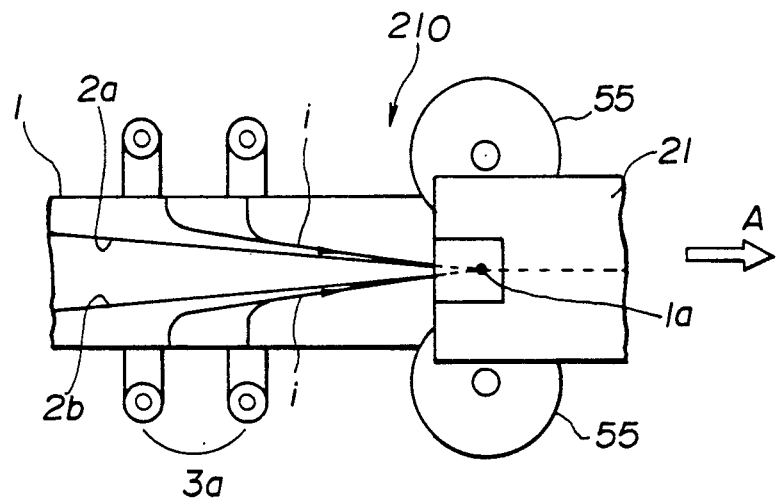
FIG. 2 is a plan view of the welding arrangement of FIG. 1, as monitored by the image monitoring portion.

FIG. 1 shows a production monitoring portion according to the invention, including an image processing unit. The image processing unit monitors a welding arrangement 210. FIG. 2 shows a plan view of the welding unit 210 as seen by a CCD equipped camera 55 (see FIG. 1) of the image processing unit. The camera 55 monitors the workpiece 1 at a welding point 1a. An analog/digital (A/D) converter 65 receives an analog signal S1 from the camera 55 and converts the analog signal S1 to a digital signal S2. An image memory 77 stores image data received via the digital signal S2 and outputs an image signal S3. A reference memory 85 is included, which contains image pattern information, stored in a ROM memory for example, which may be used for comparison with the image data stored in the image memory 77. The reference memory 85 image data is conveyed via a signal S4 output by the reference memory 85. A CPU 95 receives the image signal S3 and the reference image signal S4 for carrying out discrimination processing of the image data for detecting a present welding condition. Collectively, the A/D converter 6, the image memory 77, the reference memory 85 and the CPU 95 form an image processing portion 101 of the welding system of the invention.

The image processing portion 101 transmits an analysis signal S5 from the CPU 95 to a correction portion 117. The correction portion 117 comprises a correction amount calculating circuit 122, a signal conversion circuit 130, and a signal regulating circuit 140.

As stated above, the correction portion 117 receives an analysis signal S5 from the image processing portion 101. In addition, the correction amount calculating circuit receives a welding condition signal S9 for calculating a correction amount and the signal regulating circuit receives a welding condition reference signal S0. The welding condition signal may contain parameters indicative of high frequency electrical power level, high frequency impedance, welding speed, material (workpiece) width, material thickness, material resistance, V throat edge positional variation, squeeze roller rotational deviation etc., or any other desired processing information by which defects in the welding process may be detected. The reference signal S0 represents an optimal, or standard, welding condition for serving as a basis of comparison with the welding condition signal S9.

The signal conversion circuit 130 converts the signal S6 from the correction amount calculating circuit 122 into an conversion signal S7. The conversion signal S7 is output to the signal regulating circuit 140. The signal regulating circuit 140 outputs a regulating signal S8, based on the conversion signal S7 to a power control portion 150. The power control portion 150 regulates power to a conductive portion 10, based on the regulating signal S8 from the signal regulating circuit 140.

Also, analysis signal S5 data from the image processing portion 101 is input to an inference portion 160. Depending on the content of the analysis signal S5 data, the inference portion is active to infer, or determine a cause of undesirable welding conditions which may be present in the vicinity of the welding point 1a. In conjunction with the inference portion, a welding condition monitoring portion 170 is further provided to monitor welding condition.

Figure 3:
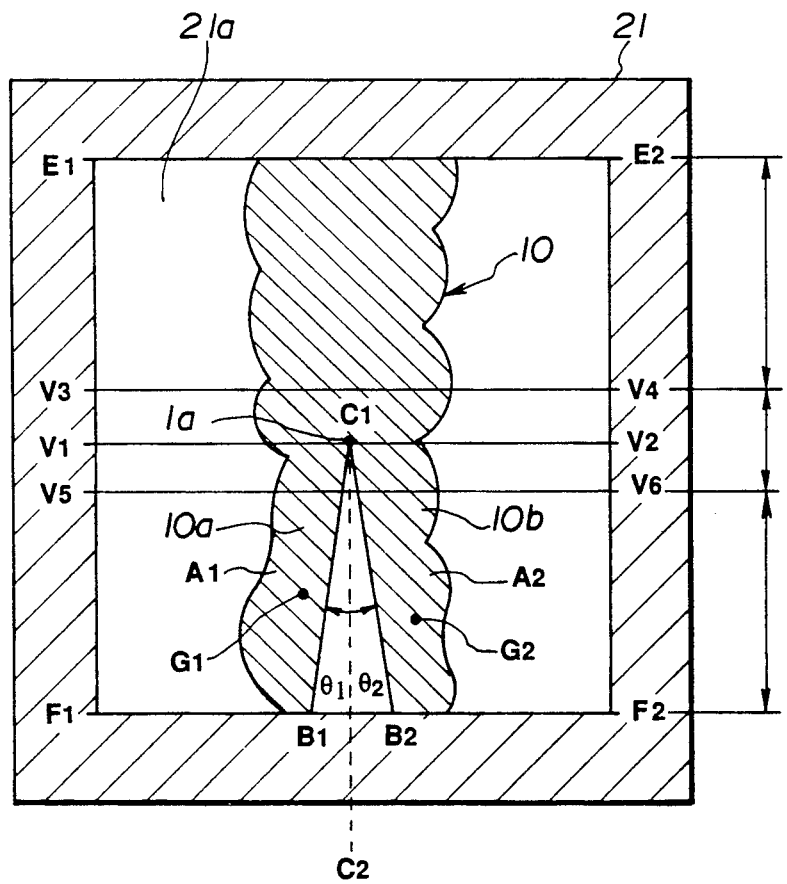
FIG. 3 is an explanatory diagram of a welding portion measurement formula utilized by the system of the invention.

Referring to FIG. 3, the inference portion receives data from the image processing portion 101 for inferring axial length, contour length, and inclination of a molten metal portion 10 of the welding in progress. The monitoring portion 170, based on the result of the inference portion 160 may be active to activate an alarm circuit 180 for warning of undesirable welding conditions inferred by the inference portion 160. Data output from the inference portion is further output to a display circuit 190 for forming a display of the welding point 1a essentially corresponding to the image shown in FIG. 3.

Furthermore, when a noise level is low, edge position fluctuation of less than 100 μm may be detected since the inference portion 160 provides image data to the display portion of substantially high resolution.

The operation of the system of FIG. 1 will be explained hereinbelow with reference to the drawings.

Figure 6:
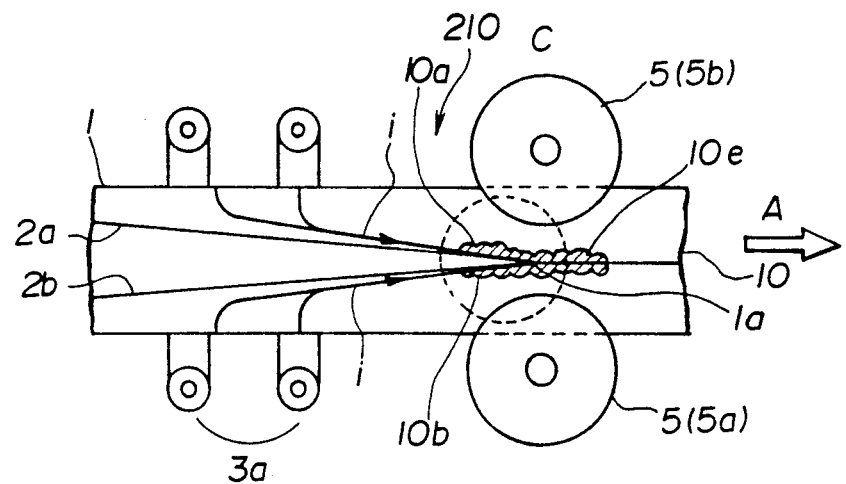
FIG. 6 is a plan view for explaining a welding mode of the invention.
Figure 7:
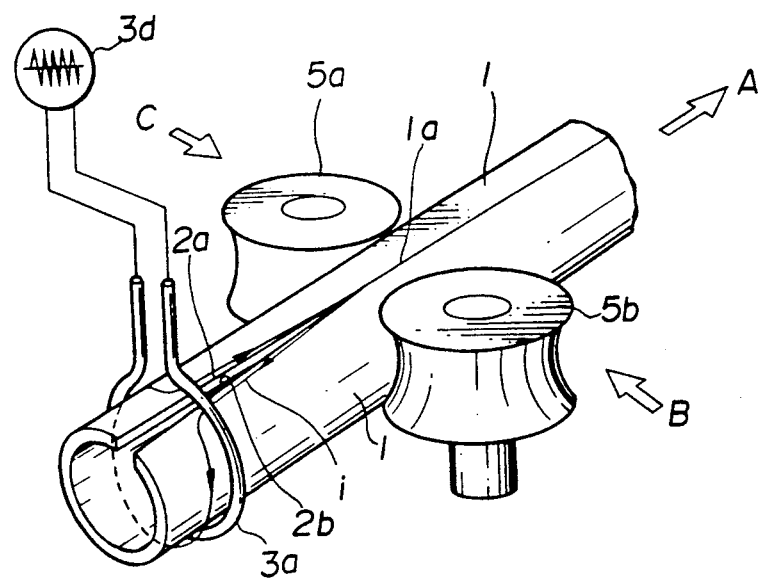
FIG. 7 is a perspective view of a guide portion of a high frequency welding arrangement of the invention.
Figure 8:
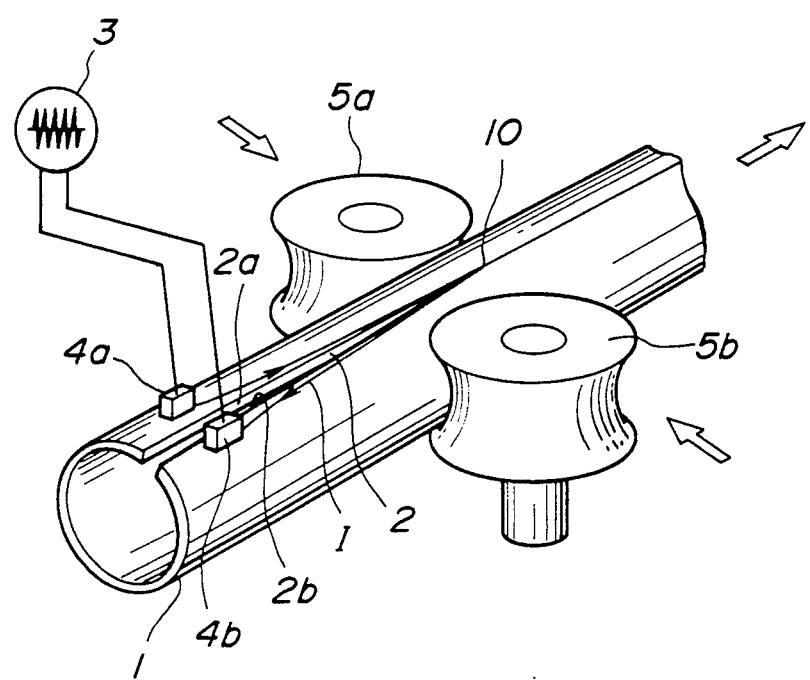
FIG. 8 shows a perspective view of a conventional seam welding arrangement.
Figure 9:
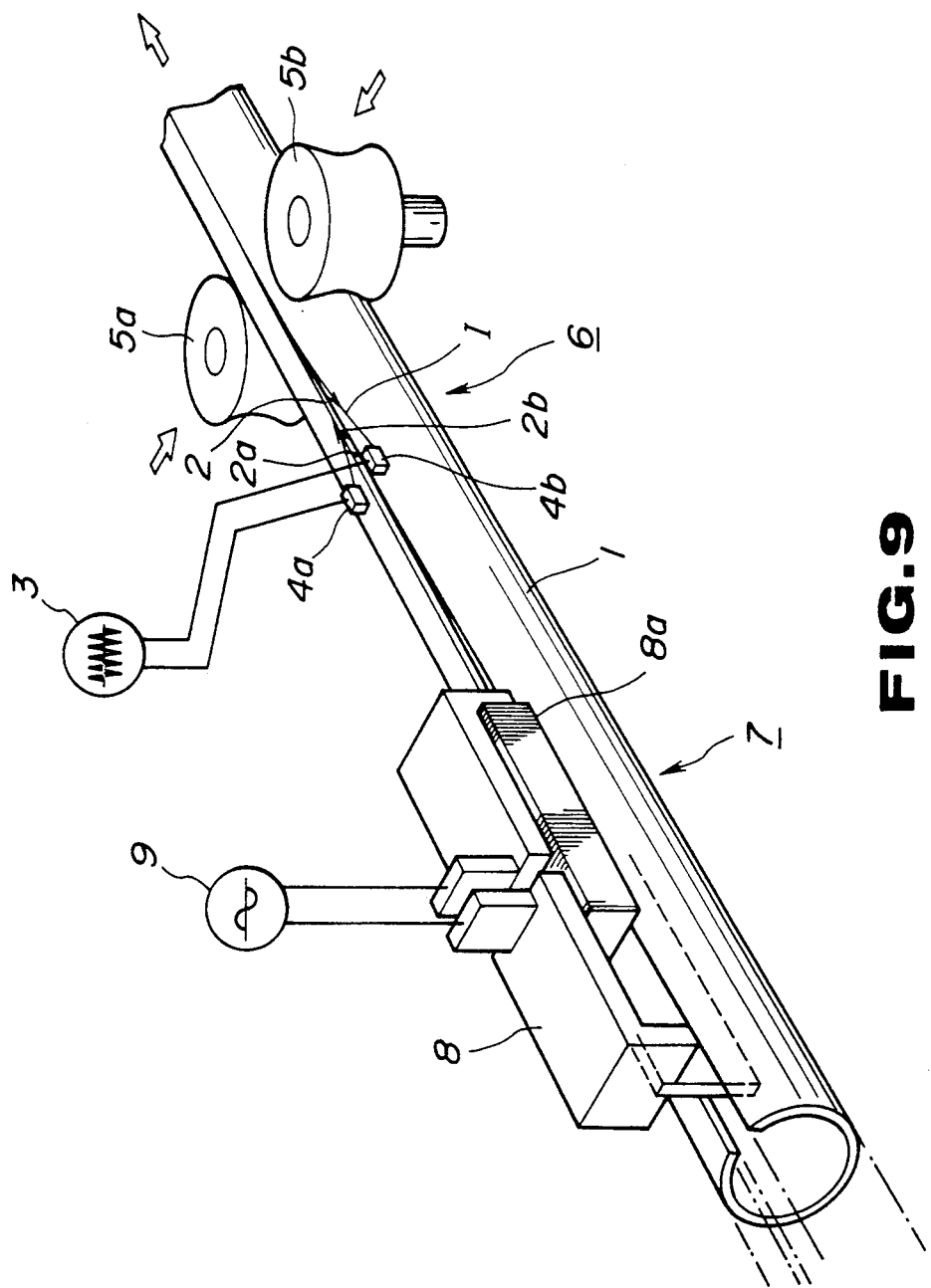
FIG. 9 shows an expanded perspective view of the complete conventional welding system of FIG. 5.

First, The camera 55 monitors an image of the vicinity of the welding point 1a, as shown in FIG. 6. Each picture element (n×m), of the image monitored by the CCD of the camera 55 is arranged on a X, Y axis referring to width x length of the image, and the luminance of each picture element is detected for providing an overall luminance distribution pattern.

The scanning image signal S1 of the camera 55 is output to the A/D converter 65 for conversion to a digital signal. The A/D converter outputs a digital signal S2 having the luminance distribution of the image data and the X, Y coordinates of the picture elements of the digital signal S2. The digital signal S2 contains a digital luminance value (i.e. 0–128) for each picture element. The digital signal S2 is then stored in the image memory portion 77. The image data from the image memory portion 77 is then input to the CPU 9 via a digital image memory signal S3.

The CPU 95 further receives reference image data from the reference memory 85 and makes a determination as to whether the welding condition is appropriate by comparing the luminance patterns from the image memory 77 with those of the reference memory 85 via a reference image data signal S4. For this purpose the image data may be divided into scanning zones. Thus, the CPU 95 analyzes the V throat of the welding in progress and the edges 10a and 10b of the seam 10 for determining whether a welding heat is excessive, insufficient or appropriate and an analysis signal S5 is generated in the CPU and output to the correction portion 117 and to the inference portion 160.

Referring to FIG. 1, a mask 210 is mounted below the CCD camera 55. The mask 21 is of a transparent material and has a window 21a. The window 21a has scanning standard lines F1-F2, E1-E2, V1-V2, V3-V4 and V5-V6 corresponding to scanning lines of the CCD of the camera 55. Referring to FIG. 3, the CCD may, for example, scan across, in the direction of the line E1-E2, and sequentially downward in the direction of the line F1-F2.

In FIG. 3, an E zone is defined between the lines E1-E2 and V3-V4. The lines V3-V4 and V5-V6 define a V zone and lines V5-V6 and F1-F2 define an F zone. Line E1-E2 is a squeeze roll side of the material 1 being welded and line F1-F2 is a forming roll, or material supply side of the material 1 being welded. A line C1-C2 defines an imaginary center line substantially corresponding to a position of the seam 10 after welding is accomplished.

The image processing portion 101 receives the scanning image data from the camera and processes same as mentioned above for generating the analysis signal S5. After the CPU 95 outputs the analysis signal S5 to the inference portion, calculation is carried out as described hereinafter.

1) Zones (F+V+E) correspond to the area within the points E1, E2, F1, and F2 which is the vicinity of the welding point 1a from which high heat energy is radiated. The width, center, circumference and highest degree of luminance for this area is calculated according to the data received from the image processing portion 101.

2) The F zone, defined between points F1, F2, V5, and V6 is differentiated for discriminating lines B1–C1 and B2–C1 and the angles $\theta 1$ and $\theta 2$ thereof in relation to the axial line C1–C2 of the tubular member being formed. A width A1–A2 of the highly heated portion in the vicinity of the welding point 1a is also determined.

3) The V zone, define between the points V3, V4, V5, and V6 represents a center of gravity of the image, or a center area of the highly heated portion is determined.

4) The E zone defined by points E1, E2, V3 and V4 representing a welded portion is discriminated.

Referring to the above, 1) width, luminance, circumference, represent proportionally rising input heat temperature; 2) The angles $\theta 1$ and $\theta 2$ based on the inclination of the edges 10a and 10b of the V throat 2 represent the balance of the workpiece (material 1) and whether an entry angle of the V throat 2 is large or small; 3) the X axis position corresponding to the line of the welded seam 10 is representative of a longitudinal center whether a welding upset condition is large or small; 4) the result of discrimination of the seam 10 determines whether or not an output frequency for heating is suitable.

Figure 5:
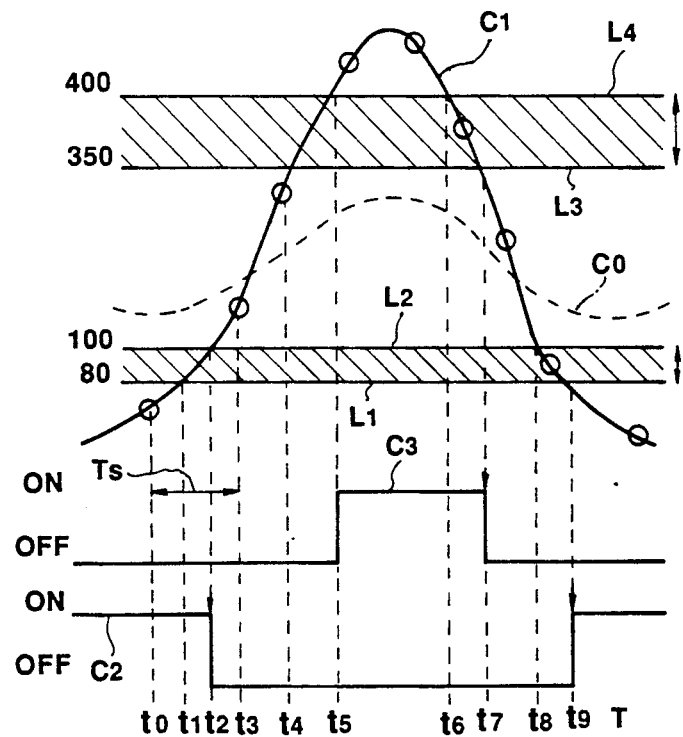
FIG. 5 is an explanatory graph showing a quality discriminating operation of the system of the invention.

FIG. 5 shows a simplified example of the operation of the monitoring portion 170 representing monitoring of a center line or X axis movement of the monitored welding operation. The broken line C0 represents permissible variation of the monitored parameters. The line C1 represents actual variation occurring in a welding operation. C2 represents an alarm signal for lower limit monitoring and C3 is a signal for upper limit monitoring. Line L1 represents a lower picture element luminance value of 80.0, for example, and L2 is an upper picture element luminance value of 100.0, for example. The lines L1 and L2 define a lower hysteresis region. Line L3 is lower luminance value of an upper hysteresis region, representing a value of 350.0, for example, and line L4 is an upper luminance value of the upper hysteresis region and represents a level of 400.0, according to the present embodiment. Values below the line L1 and above the line L2 represent undesirable welding conditions.

Figure 4:
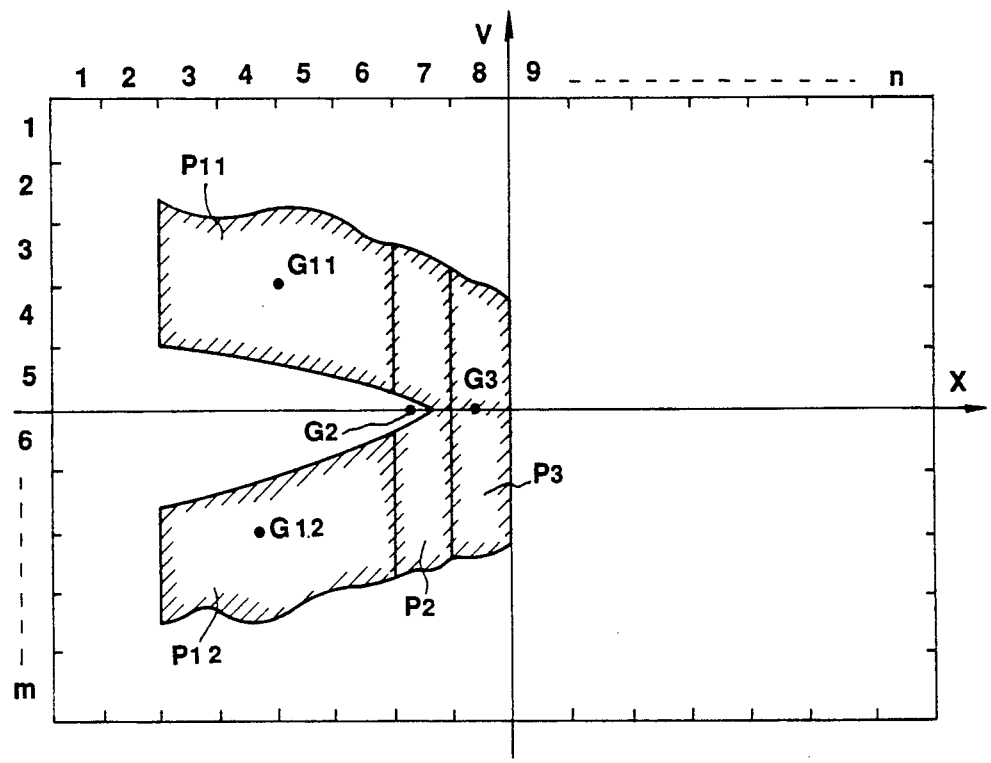
FIG. 4 is a pattern measurement diagram of a weld.

Further, the time increments between a time t0 and a time t3 represent a image processing cycle Ts. As seen in the drawing, when the monitored center of gravity reaches the lower monitoring limit at a time t2, the inference portion 160 is active to send a lower limit alarm signal to the alarm circuit 180. Similarly, as the center of gravity reaches beyond the upper hysteresis region at a time t5, the inference portion is active to send an upper limit alarm signal to the alarm circuit 180. The monitoring portion has a display means, associated with a display circuit 190 which displays an image such as shown in FIG. 4 the image is updated sequentially to show a current status, or welding condition. According to this, determination of the welding condition may be assessed by a human operator by monitoring the image.

Further to say, the ranges of the upper and lower hysteresis regions may be determined optionally, by experiment, etc., or no hysteresis region may be provided. Further, the hysteresis regions may be associated with an alarm or an ON/OFF signal for providing warning of undesirable welding conditions. Although, in the method for determining whether a welding condition is good or bad according to the above described embodiment, X axis movement of the workpiece is monitored, a Y axis position, overall area of the highly heated portion, axial length of the highly heated area, axial width of the highly heated area, circumference, or other parameters may be used in image processing according to the invention.

The present invention is effective in analyzing welding conditions wherein a molten metal portion occurs around the edges defining the V throat. Specifically, observation by CCD scanning is made to divide the upstream and downstream regions which contain the point where both edges of the V throat are merged. The CCD scanning lines are used to divide the high temperature portion in to scanning zones. In digital image processing of the illuminated state of the image from the camera, each picture element has a luminance value which is measured. The luminance value is digitized and converted into a monochrome image and a characteristic amount of the monochrome image is determined. In this case the image consists of a V throat with divergent side edges which merge into a single image, or welded seam. Masking is accomplished from the upstream side of the merging point and digitizing of the image is accomplished and the image is divided into zones and the luminance distribution of each of the edges of the V throat may be determined. Characteristic amounts of each of the images is determined and calculation is made to give the average over E zone and F zone. Subtraction is made from the characteristic amounts of the area of the F zone and the remainder represents the balance of the heated state of the edges defining the V throat.

Thus, the correction portion 122 receives the analysis signal S5 form the image processing portion 101 and the welding condition signal S9 for calculating a correction amount. The correction amount signal S6 is then input to the signal conversion circuit 130. The conversion signal S7 is then output to the signal regulating circuit 140. The signal regulating circuit 140 then compares the level of the conversion signal S7 (i.e. an analog signal) to the power setting signal S0 for producing a power adjusting signal S8 which is output to the power control portion 150. The power control portion 150 then sets a power level to the work coil for adjusting welding heat.

Since, more than 100 picture elements are utilized at each side of the image, observation of positional variation of 100 μm may be accomplished. For optimal performance of the system, it will be noted that the monitored area should be shielded from external light.

Further, the image processing portion 101 uses the reference memory 85 as a standard for analyzing image data from the CCD camera 55, thus, according to the above described arrangement, highly accurate adjustment of welding heat can be accomplished. Alternatively to providing the reference memory values, a linearizer may be utilized.

Thus, the production monitoring portion of the welding system of the invention can appropriately monitor various welding conditions, such as temperature, shape, operating level, etc., for establishing optimum conditions for welding operation and further, can provide visual information for a system operator in a continuous fashion with the capability of sounding an alarm if monitored welding conditions fall outside of a predetermined range.

Figure 10:
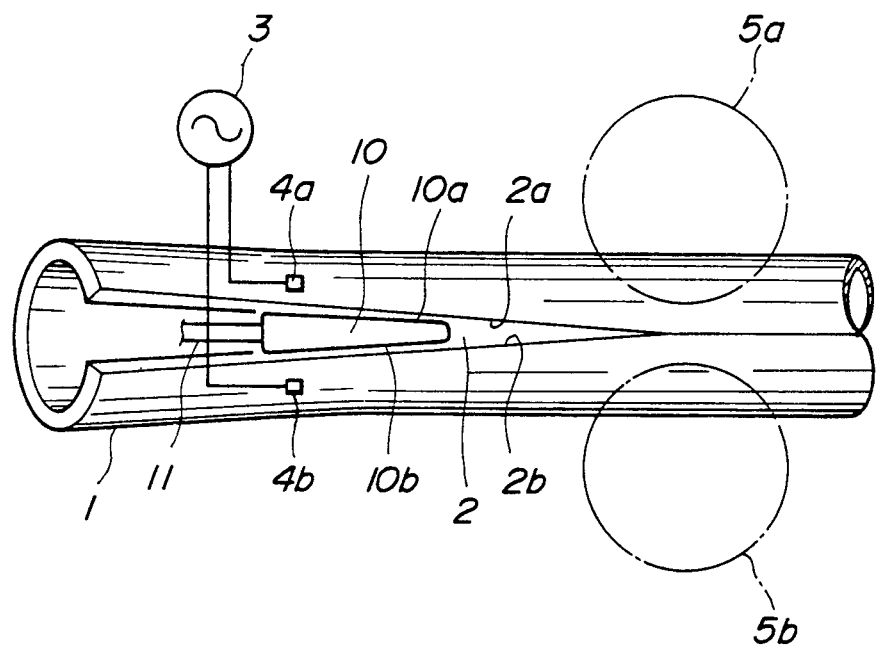
FIG. 10 is a schematic diagram of a conductive portion of the welding system of the invention.

Referring now to FIG. 10, the electrical characteristics of the high frequency welding system according to the invention will be described in detail in connection with a conductive portion 10 of the welding system. In FIG. 10, a material 1 which is a metallic, plate material being formed into a pipe, for example, is shown. Opposing longitudinal edges of the material 1 are contacted with each other at one end of the material forming a cylindrical member. Contacting of the sides of one end of the material 1 forms a V throat 2 having a first side 2a and a second side 2b.

Figure 11A:
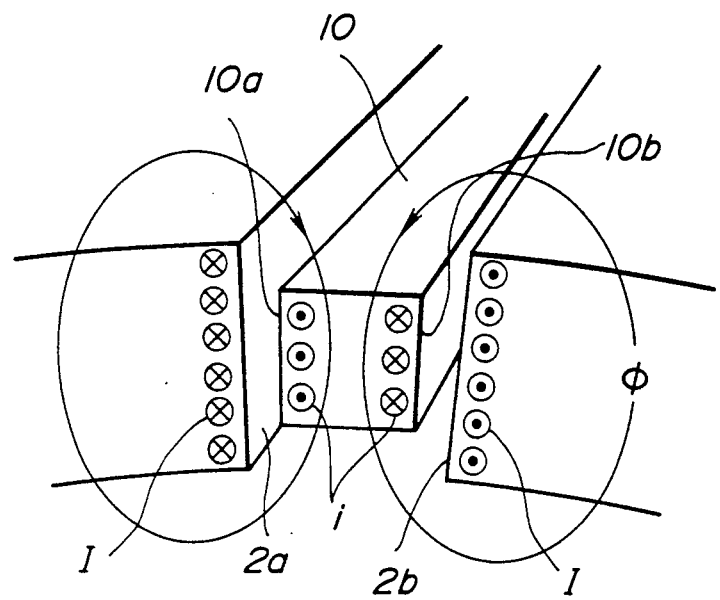
FIG. 11(A) is an explanatory perspective view of the high frequency welding conductive portion shown in FIG. 10.
Figure 11B:
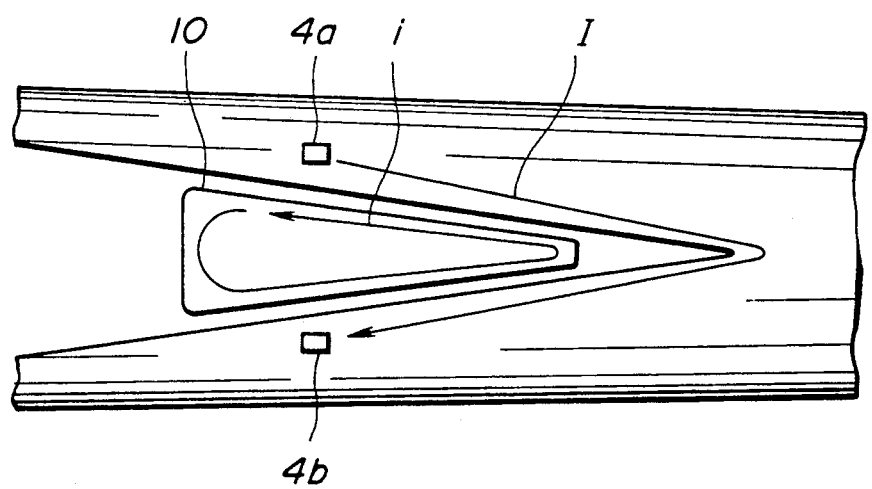
FIG. 11(B) is a schematic view of a high frequency welding conductive portion of the invention showing a relationship between a welding current and an inductive current.

As seen in FIG. 11, a high frequency welding current I is applied to the V throat 2 for forming an alternating field. Magnetic flux from the alternating field crosses over to a wedge-shaped conductive portion 10 which is arranged in the V throat 2. The causing a cyclic inductive current i. When the inductive current i is adjacent the welding current I, the inductive current is present at outer edges 10a and 10b of the conductive portion 10 and distribution of the adjacent welding current I fluctuates. Current distribution is high at a center region of the opposed edges 10a and 10b of the conductive portion 10 and 2a and 2b of the V throat 2 and low at corner portions of the opposed edges 10a, 10b and 2a, 2b. Current distribution is essentially even in the thickness direction of the material 1 along the edges 2a and 2b of the V throat 2, providing substantially identical heating characteristics of the edges 2a and 2b. Thus, along the edges 2a and 2b of the V throat, a comparatively low frequency heating action is established which is optimal for a welding apparatus.

Since the conductive portion 10 is formed of a metal such as copper, for example, with low electrical resistance, gradual heating of the conductive portion is avoided and cooling means is therefore desirable to prevent damage by melting etc. The cooling means may comprise, for example, means for circulating a cooling medium through the conductive portion 10 including a supply/discharge tube 11 communicating with the interior of the conductive portion 10. As a cooling medium, either gas or liquid state cooling means may be employed. Further, in order to prevent corrosion of the conductive portion 10, an inert, reducing gas should be utilized for cooling.

Figure 12:
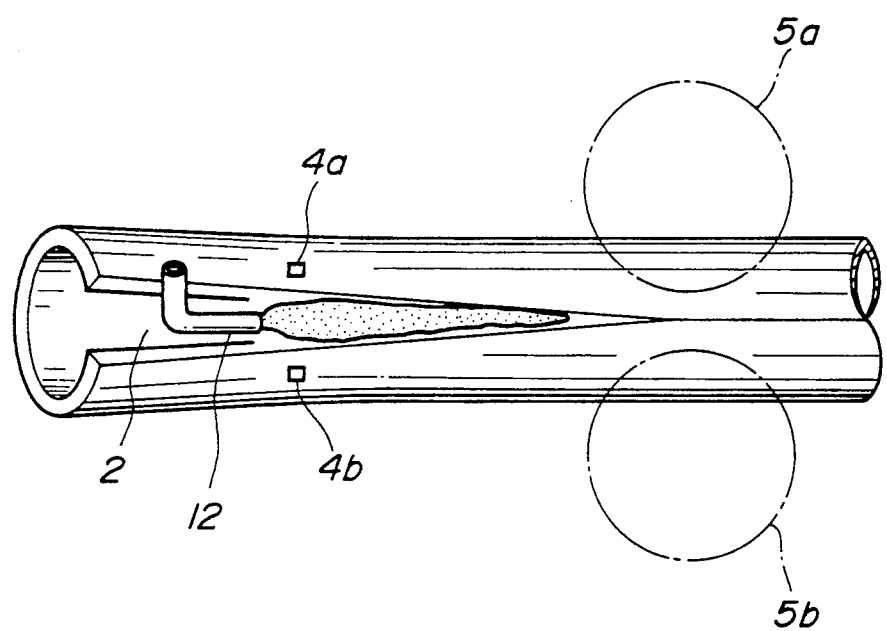
FIG. 12 is a schematic view of an alternative construction of a high frequency welding conductive portion according to the invention.
Figure 13A:
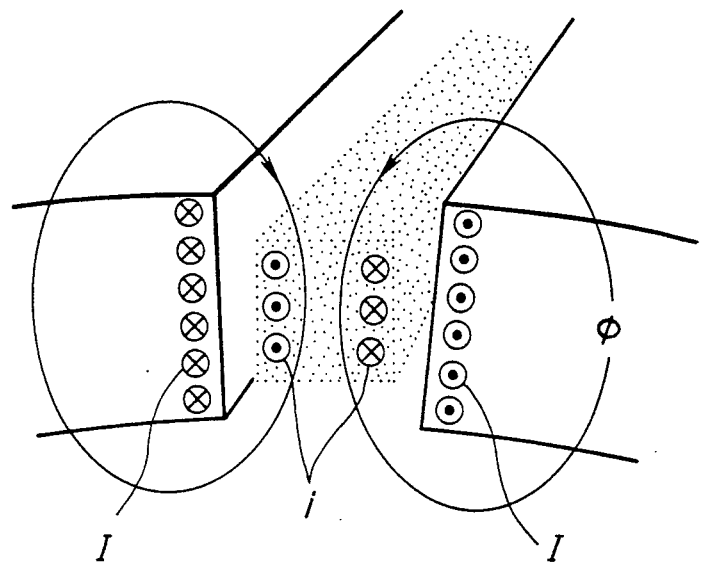
FIGS. 13(A) and (B) are an explanatory diagrams showing a relationship between ionized gas flow and inductive current.
Figure 13B:
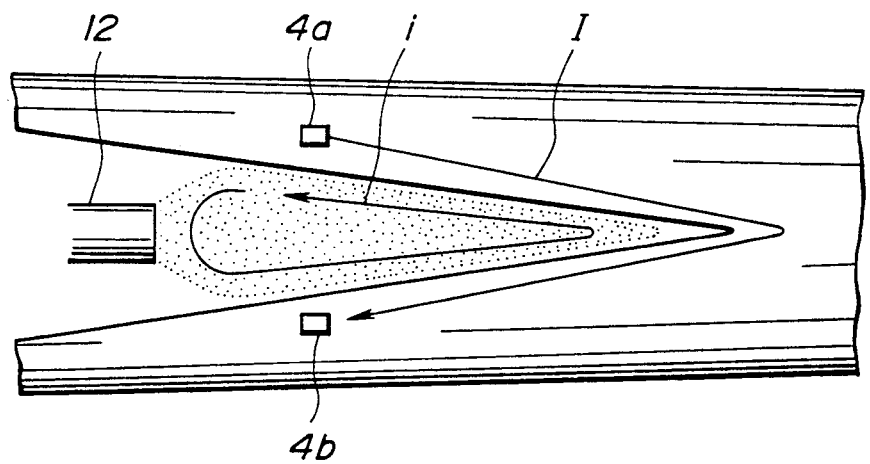
Figure 14A:
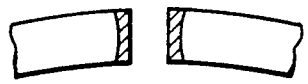
FIGS. 14(A), (B) and (C) are schematic diagrams explaining a high frequency induction welding process.
Figure 14B:
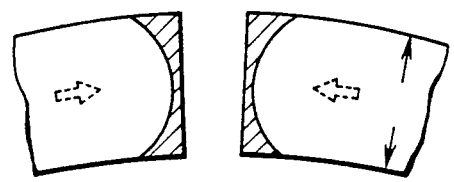
Figure 14C:
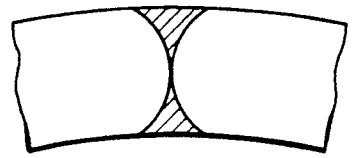

FIG. 12 shows an alternative construction of a conductive portion of a high frequency welding system according to the invention. According to this arrangement, an outlet nozzle 12 for emitting an ionized gas is arranged in the V throat 2. For this purpose, either a combustible gas or a plasma gas may be utilized. In welding operation, the ionized gas is emitted from the nozzle 12 into the V throat 2 with substantially the same results as in the above-described first embodiment. That is to say, the welding current I forms an alternating field and magnetic flux, causing generation of the induction current i in the welding gas as shown in FIGS. 13(A) and (B). According to this, a Lorentz force is generated between the ionized gas and the welding current I at the edges 2a and 2b of the V throat 2 for effectively sealing the edges 2a and 2b.

When a combustible gas or plasma gas is used as the ionized gas, it is preferable that the gas temperature be substantially high for enhancing a heating effect of the edges 2a, 2b of the V-shaped opening 2. Namely, for plasma gas, a temperature several times the combustion temperature (2300° K.) is preferable. Further regarding plasma gas, in order not to encourage oxidization of a metal being welded, an inert and/or reducing gas should be employed.

Thus, according to the present invention, ionized gas, being either a combustible gas a reducing gas, may be utilized according to the invention. and, at high gas temperatures, optimal sealing of edge portions 2a and 2b of the V throat 2 can be achieved.

Figure 15:
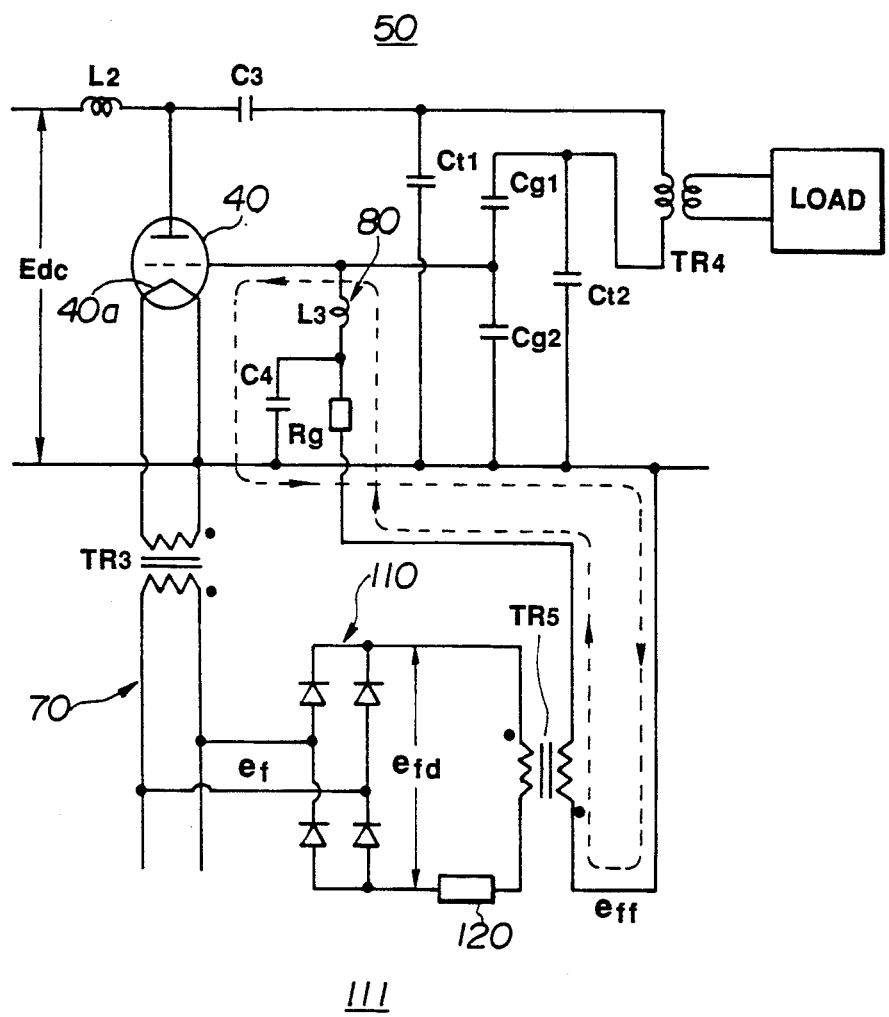
FIG. 15 is a schematic diagram of a high frequency voltage output circuit with ripple current suppressing characteristics.
Figure 19:
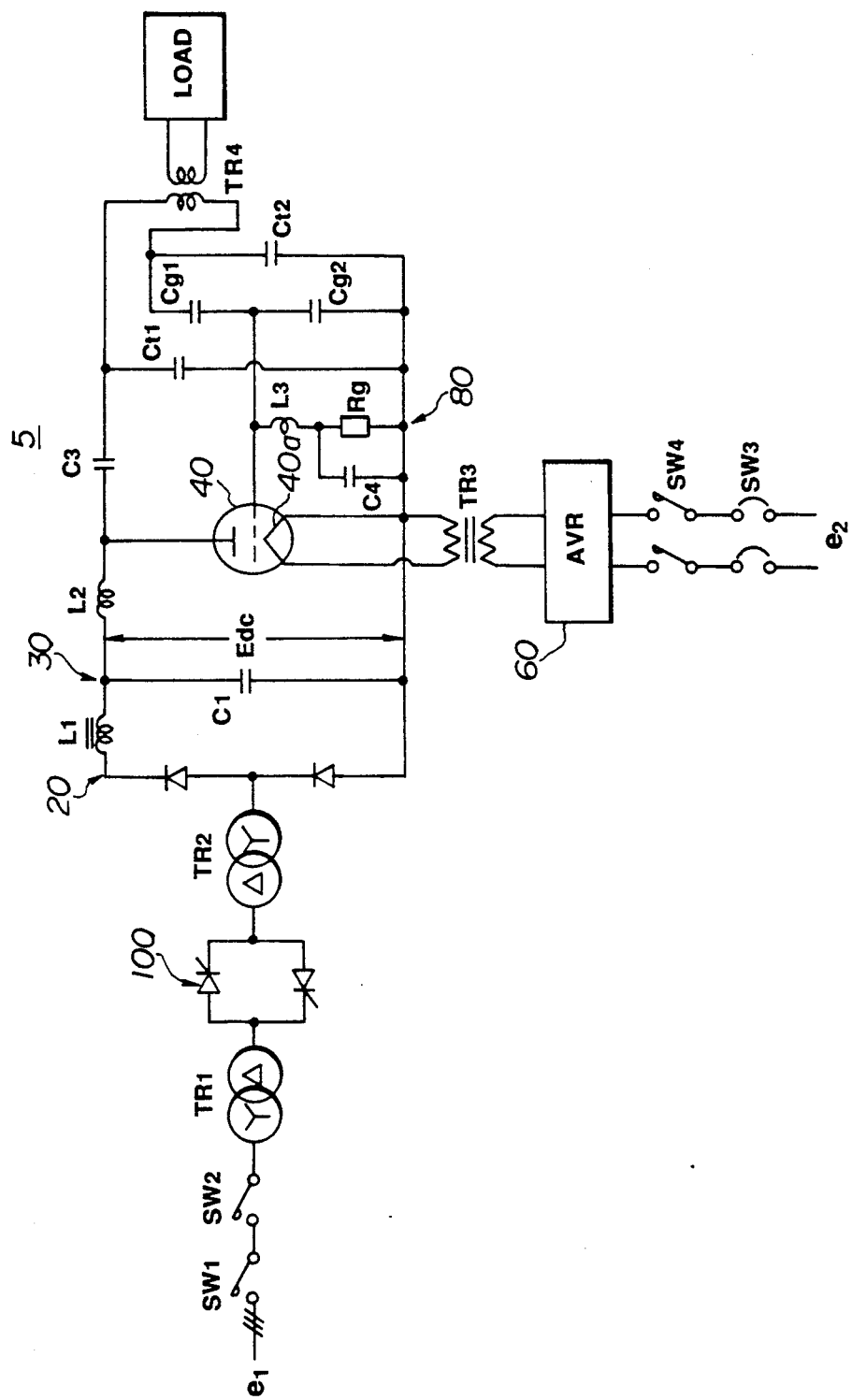
FIG. 19 is a schematic diagram of a conventional high frequency voltage output circuit.

For providing a suitable high frequency current for effecting a welding system according to the invention, a high frequency oscillator is further provided. FIG. 15 shows a schematic diagram of a high frequency oscillator according to the invention. Description which corresponds to that given in relation to the previously described prior art circuit of FIG. 19 will be omitted for brevity.

A higher harmonic frequency generator circuit 111 includes an all wave rectifier circuit 110 for connection with a primary voltage and a filament 40a of the electron tube 40 via a first transformer TR3 connected at a first side of the rectifier circuit 110. A second transformer TR5 is connected at a second side of the all wave rectifier circuit 110 for providing a secondary voltage via a grid resistor Rg to a grid bias circuit 80 for the electron tube 40. A dc filter 120 acts to cut a dc (direct current) voltage component to the second transformer TR5.

The functioning of the above-described circuit will be explained herein below with reference to FIGS. 16 and 17.

Figure 16:
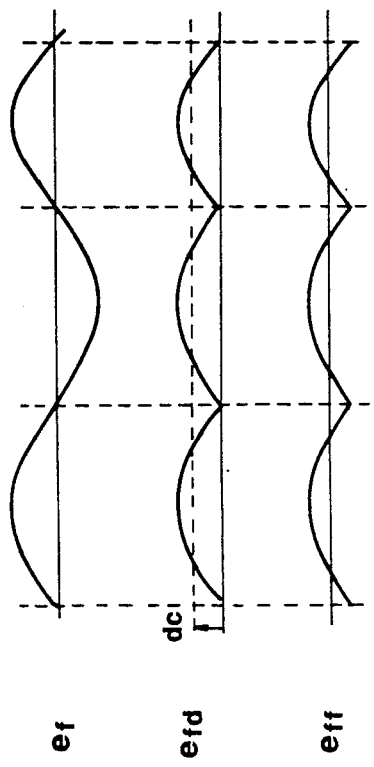
FIG. 16 is a graph showing suppression of high speed voltage irregularities according to the invention.

Referring to FIG. 16, the all wave rectifier circuit 110 receives the primary voltage $e_f$, via the transformer TR3 (FIG. 16(A)). The primary voltage generates an output voltage $e_{fd}$ in the rectifier circuit 110 (FIG. 16(B)). The second transformer TR5 receives the voltage $e_{fd}$ via the dc filter 120 with a direct current component removed and the secondary voltage $e_{ff}$ (FIG. 16(C)) is generated having a higher harmonic frequency than the primary voltage $e_f$.

When the secondary voltage $e_{ff}$ is supplied to the filament 4a via the grid resistor Rg of the grid bias circuit 8, if large fluctuation in the applied voltage occurs, the grid bias voltage oscillates on the minus side and is superimposed on the applied voltage for suppressing he fluctuation.

When heating of the electron tube by alternating current occurs, on average, a filament charge time for achieving a given heat value may be given as (J/sec=W). Theoretically, a thermal energy Q according to the following equation is applied to the filament:

$$Q = Q_{1900} + \int Wf \sin(\omega t - \psi)dt - \int \omega \text{rad} \sin(\omega t - \psi)dw \quad (1)$$

wherein:
Wf = Quantity of heat per unit time (Joule/sec)
$Q_{1900}$ = quantity of heat required
$\psi$ = phase shift
by this, a filament temperature of 1900° K. may be achieved.

If a charge heat is $R_{if}^2$ (R = filament resistance, $i_f$ = filament current), is added to the filament single phase voltage $e_f$, the frequency of the filament temperature T is doubled.

Figure 17:
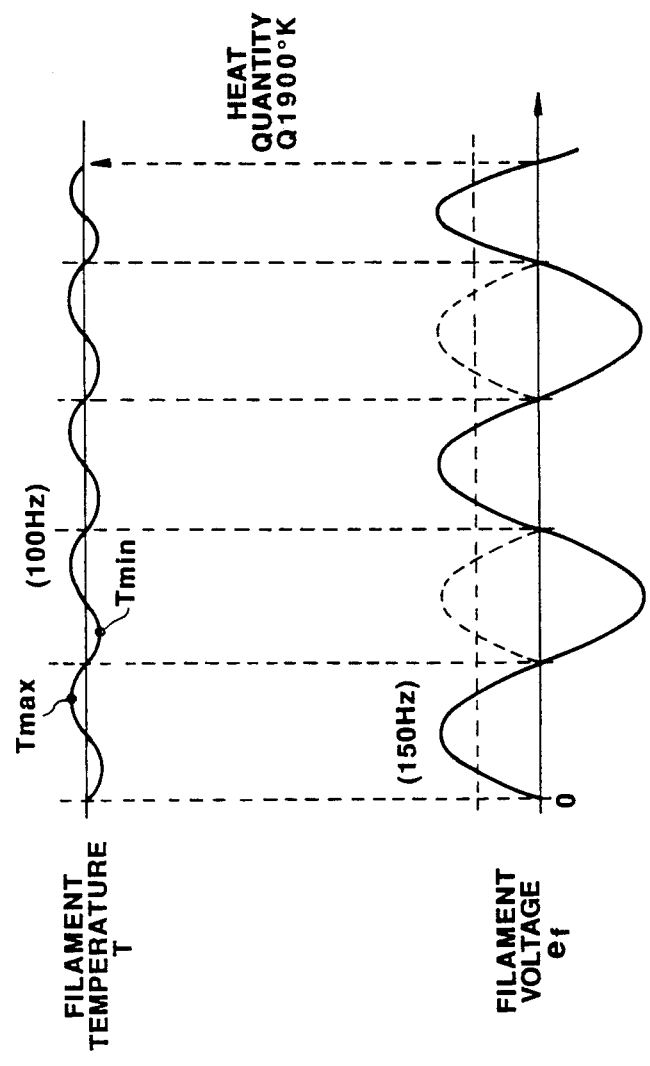
FIG. 17 shows a graph of full scale monitoring of temperature and filament voltage for quality monitoring welding and heating processing.

Therefore, referring to FIG. 17, fluctuation of the filament temperature based on high frequency output voltage pulsation of the single phase alternating current can be minimized, since the voltage $e_{ff}$ is superimposed with the bias voltage based on a canceling, or compensating, high frequency output voltage pulsation. Also, ripple in the rectifier of the direct current electrical source circuit based on high frequency output voltage upper harmonic pulsation can also be minimized. Further, from the voltage of the transformer TR5, a variable potential resistor, or the like, may be added for adjusting the grid resistance.

Hereinbelow, an alternative construction of a high frequency oscillator according to the invention will be described with reference to FIG. 18. Elements which are identical with those of the above-described oscillator circuit will be omitted.

Figure 18:
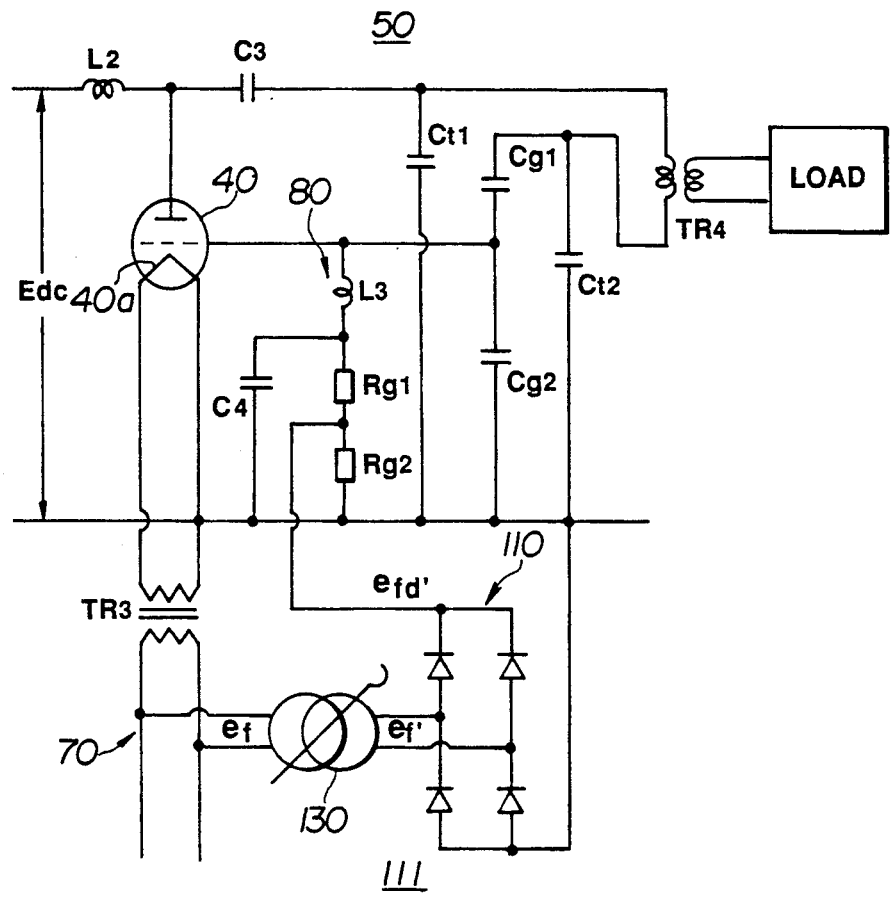
FIG. 18 is a schematic diagram of an alternative construction of a high frequency voltage output circuit with ripple current suppressing characteristics.

As seen in FIG. 18, a voltage regulator 130 supplying the primary voltage $e_f$ for the filament 40a is provided. A second side of the voltage regulator 130 is connected to an all wave rectifier 110. Grid resistors $Rg_1$, $Rg_2$ provide the grid resistance Rg. The grid resistor $Rg_2$ is applied a current $e_{fd}$ FIG. rom the single phase all wave rectifier 110 at both terminals thereof.

According to this arrangement, since the grid bias voltage adjusts the frequency doubled applied voltage to the filament 40a, high frequency fluctuation in an output voltage can be effectively minimized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A welding system, comprising:
    a work piece fed to a welding point at which a V throat present in said work piece is fuzed into a welded seam;
    a CCD equipped camera for continuously scanning a welding operation and outputting a first signal indicative thereof;
    masking means, interposed between said camera and said welding point for providing a visual reference for dividing a camera image into zones;
    conversion means for receiving an output from said camera and converting said output to a digital for an outputting a second signal indicative thereof;
    first memory means for storing digital welding image data based on said digital signal;
    second momory means for storing reference image data;
    processing means for accessing said first and second memory means and comparing said reference image data with said welding image data and producing a third signal indicative of said comparison;
    monitoring means, receiving said third signal and monitoring a welding condition based thereon, said monitoring means outputting sequentially updated image data based on said third signal for showing a current welding condition and outputting an alarm signal indicative of undesirable welding conditions including upper and lower heat values when said welding condition is excessive of said predetermined conditions;
    display means receiving said sequentially updated image data;
    alarm means receiving said alarm signal;
    correction adjustment means, recieving said third signal and calculating a degree of adjustment of an output power of said welding system based on said third signal and outputting a fourth signal indicative of said degree of adjustment;
    second conversion means, receiving said fourth signal and converting said signal for outputting a fifth, analog signal corresponding to said degree of adjustment;
    signal regulating means, receiving said fifth signal and further receiving a sixth signal indicative of a reference power level, said signal regulating means comparing said fifth and sixth signals and outputting a seventh signal indicative of a power variation value;
    power output means, receiving said seventh signal and adjusting a power level of a heating portion of said welding system;
    a conductive member, positioned in a V throat of a tubular member being welded for establishing an inductive current at said V throat, sufficiently heating a welding point of said tubular member for effecting continuous welding of a seam along said tubular member in accordance with control effected by said image processing portion, said monitoring portion and said power control portion.

2. A welding system as set forth in claim 1, wherein parameters of said sixth signal indicate at least one of high frequency electrical power level, high frequency impedance, welding speed, material width, material thickness, material resistance, V throat edge positional variation, and squeeze roller rotational deviation.

3. A welding system as set forth in claim 1, wherein the luminance of each picture element is detected by said camera for providing an overall luminance distribution pattern in said image data.

4. A welding system as set forth in claim 1, wherein when said first signal from said camera is output to said conversion means for conversion to a digital signal, said conversion means outputting said second signal including luminance distribution data derived from said first signal and X, Y coordinates of the image data.

5. A welding system as set forth in claim 4, wherein said processing means makes a determination as to whether the welding condition is appropriate by comparing the luminance patterns from said first memory means with those of said second memory means, the image data being divided into scanning zones and said processing means analyzing the V throat of the welding in progress and the edges thereof and determining whether a welding heat is excessive, insufficient or appropriate and outputting said third signal indicative thereof to the correction portion and to the monitoring portion.

6. A welding system as set forth in claim 1, wherein said mask is of a transparent material and has a window portion formed therethrough, said window having scanning lines marked thereon corresponding to scanning lines of the CCD of the camera.

7. A welding system as set forth in claim 1, wherein said zones comprise a first zone upstream of a welding point wherein two edges of said V throat are separated, a heating condition of said edges being determined, a second zone corresponding to said welding point at which said edges of said V throat are merged a condition of a welding bead being determined, and a third zone downstream of said welding point at which a condition of a welded portion is determined.

8. A welding system as set forth in claim 1, wherein hysteresis of upper and lower heat range values is provided.

9. A welding system as set forth in claim 1, wherein an area scanned by said camera is shielded from external light.

10. A welding system as set forth in claim 1, wherein said conductive member is formed of a metal with low electrical resistance, and further comprising cooling means wherein a cooling medium is circulated through the conductive member via a supply/discharge tube communicating with the interior of the conductive member.

11. A welding system as set forth in claim 10, wherein an inert, reducing gas is be utilized for cooling.

12. A welding system as set forth in claim 1, wherein said conductive member comprises an outlet nozzle for emitting an ionized gas and is arranged in the V throat of said workpiece, the ionized gas is emitted from the nozzle 12 into the V throat of said workpiece such that a welding current I forms an alternating field, magnetic flux thereby causing generation of an induction current i in said ionized gas.

13. A welding system as set forth in claim 12, wherein said conductive member utilizes an inert combustible gas.

14. A welding system as set forth in claim 12, wherein said conductive member utilizes an inert plasma gas.

15. A welding system as set forth in claim 14, wherein said plasma gas is preheated to a temperature which is a multiple of the combustion temperature.

16. A welding system as set forth in claim 1, wherein said power output means comprises a higher harmonic frequency generator circuit including an all wave rectifier connected with a primary voltage and a filament of an electron tube for supplying heating via a first transformer connected at a first side of the rectifier circuit a second transformer connected at a second side of said all wave rectifier circuit providing a secondary voltage via a grid resistor to a grid bias circuit of said electron tube and a dc filter cutting dc voltage component to the second transformer.

17. A welding system as set forth in claim 1, wherein said power output means comprises a voltage regulator supplying the primary voltage for a filament of an electron tube for supplying heating to said workpiece, a second side of the voltage regulator being connected to an all wave rectifier, two grid resistors connected to provide a grid resistance such that one of said grid resistors is applied a current from the single phase all wave rectifier at both terminals thereof.

* * * * *